United States Patent

[11] 3,625,852

[72] Inventor Edward P. Anderson
 Livingston, N.J.
[21] Appl. No. 837,223
[22] Filed June 27, 1969
[45] Patented Dec. 7, 1971
[73] Assignee Engelhard Minerals & Chemicals Corporation
 Newark, N.J.

[54] MARINE ANTIFOULING SYSTEM
 3 Claims, 2 Drawing Figs.
[52] U.S. Cl. .................................................. 204/196,
 114/222, 204/290 F
[51] Int. Cl. ................................................ C23f 13/00
[50] Field of Search ........................................... 204/147,
 148, 196, 197; 114/222

[56] References Cited
 UNITED STATES PATENTS
Re. 13,652 11/1913 Frazier ........................ 204/197
 843,357 2/1907 Partee et al. .................. 204/147

| 2,435,986 | 2/1948 | Taylor | 204/196 |
| 2,870,079 | 1/1959 | McCall | 204/197 |
| 3,071,531 | 1/1963 | Hosford | 204/196 |
| 3,241,512 | 3/1966 | Green | 204/196 |
| 3,303,118 | 2/1967 | Anderson | 204/196 |

Primary Examiner—T. Tung
Attorney—Samuel Kahn

ABSTRACT: A marine antifouling system for boat or ship hulls having a keel and sides diverging upwardly therefrom, the antifouling system comprising a pair of laterally spaced elongated anode electrode components each mounted externally on one side of the hull substantially adjacent the keel and lengthwise thereof, an elongated cathode electrode component mounted externally on and lengthwise of the keel in spaced relationship between the anode electrode components, a source of electrical current and electrical circuit means therefor for energizing the anode electrode components with a positive potential and the cathode electrode component with a negative potential with the cathode electrode component being electrolytically common to the anode electrode components.

INVENTOR.
EDWARD P. ANDERSON
BY
AGENT

MARINE ANTIFOULING SYSTEM

BACKGROUND OF THE INVENTION

Marine fouling of boat or ship hulls has always been a serious problem because the growth thereon of marine grasses and the formation of incrustations of barnacles, tunicates, and the like fouling organisms, will contribute to slow a craft underway, increase its fuel consumption, and make it difficult to handle. The remedy heretofore has been through the use of toxic paints which slowly release such marine growth poisoners as copper or tin salts. This method is effective until the poisoners are leached from the paint and fouling again takes place, whereby it becomes expensively necessary to drydock the craft and to scrape off the fouling material and to repaint the hull.

It is herein contemplated to provide a permanent means for the control and prevention of marine fouling by the use of an electrical antifouling system which electrochemically produces the toxic agents chlorine and sodium hypochlorite adjacent the boat or ship hull to prevent the formation and growth of the fouling organisms.

SUMMARY OF THE INVENTION

In accordance with the invention, there is provided a marine antifouling system for boat or ship hulls having a keel and sides diverging upwardly therefrom, the antifouling system comprising a pair of laterally spaced elongated anode electrode components each mounted externally on one side of the hull substantially adjacent the keel and lengthwise thereof, an elongated cathode electrode component mounted externally on and lengthwise of the keel in spaced relationship between the anode electrode components, a source of electrical current and electrical circuit means therefor for energizing the anode electrode components with a positive potential and the cathode electrode component with a negative potential with the cathode electrode component being electrolytically common to the anode electrode components. When the anodes and cathode are suitably energized when in contact with water, e.g., sea water, as an electrolyte, electrical current flows from the anodes to the common cathode through the electrolyte and sodium hydroxide and hydrogen gas bubbles are evolved from the electrolyte at the common cathode and they pass upwardly along both sides of the hull over the two anodes. At the anodes chlorine gas and oxygen bubbles are evolved from the electrolyte thereby chemically partially combining with the sodium hydroxide to produce sodium hypochlorite whereby hydrogen and chlorine gas bubbles together with sodium hypochlorite continues to pass upwardly of the sides of the hull and thereby poisoning or preventing the accumulation of any marine fouling organisms.

DESCRIPTION OF THE PREFERRED EMBODIMENTS

Figure 1:
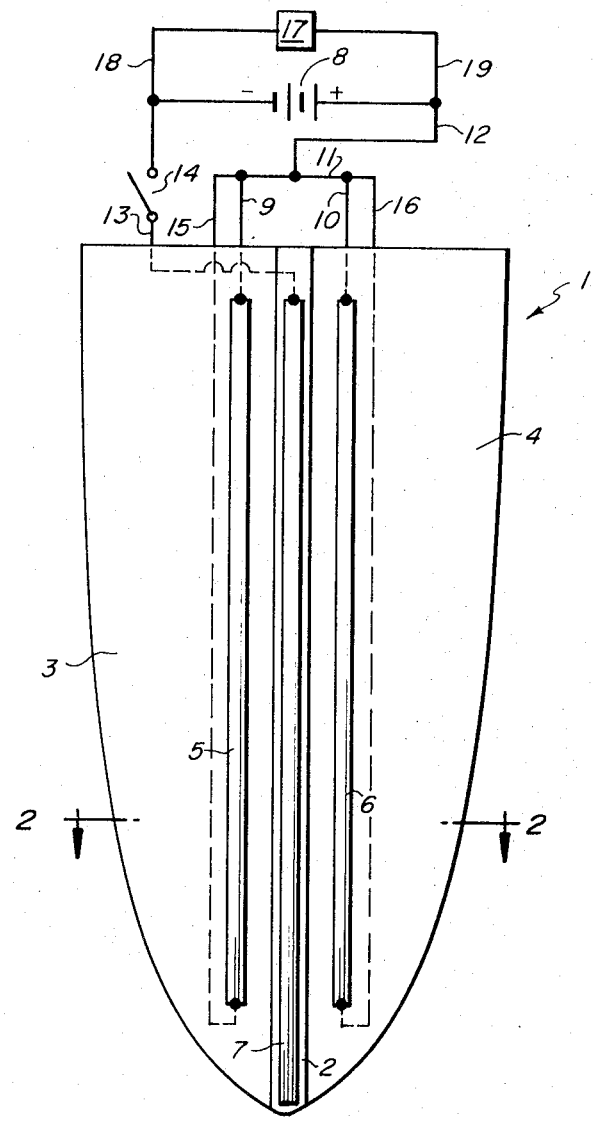
FIG. 1 illustrates a bottom view of a boat hull including partly in elevation and partly in schematic the marine antifouling system according to the invention.

Referring to the FIGS., the marine antifouling system of the invention for a boat or ship hull 1 having a keel 2 and sides 3 and 4 diverging upwardly therefrom comprises a pair of laterally spaced elongated anode electrode components 5 and 6 each mounted, respectively, externally on sides 3 and 4 adjacent the keel 2 and lengthwise thereof. A cathode electrode component 7 is mounted externally on and lengthwise of the keel 2 in spaced relationship between the anode electrodes 5 and 6. A source of electrical current 8 is provided for energizing the electrodes.

The source of current 8 is illustrated as a direct current source, but it is usually a shore-based alternating current source of 120 volts 60 cycles rectified to provide the direct current potential to the electrodes because the antifouling system is operated when the boat or ship is at rest at dock. Fouling occurs when the boat or ship is at rest and does not occur to any appreciable extent when the boat or ship is moving. As illustrated, the anode electrode elements 5 and 6 are electrically connected in parallel to the positive side of the source 8 by means of conductors 9 and 10, respectively, which are bridged by bridge conductor 11 with conductor 12 connected to the conductor 11 and the positive side of source 8. The cathode electrode element is connected to the negative side of source 8 by means of conductor 13 through the switch 14, preferably, the anodes 5 and 6 are in the form of a tape composed of tantalum, titanium or niobium having its surface coated with platinum and the cathode 7 is in the form of a tape composed of stainless steel, brass, bronze or copper. However, the cathode 7 may also be of the same composition as the anodes. Since the electrodes are in the form of substantially long tapes, e.g., 35 feet in length, there is substantial electrical resistance especially with the anodes of platinum-coated titanium, tantalum or niobium. Therefore in order to have a favorable current distribution throughout the length of the anodes each anode 5 and 6 is provided with a secondary conductor 15 and 16, respectively, of high electrical conductivity e.g., copper, electrically connected in parallel with its respective anode and internally of the hull. As illustrated, the secondary conductor 15 is connected to the bridge conductor 11 and across the anode tape 5 to its remote end. The secondary conductor 16 is identically connected across anode tape 6.

Figure 2:
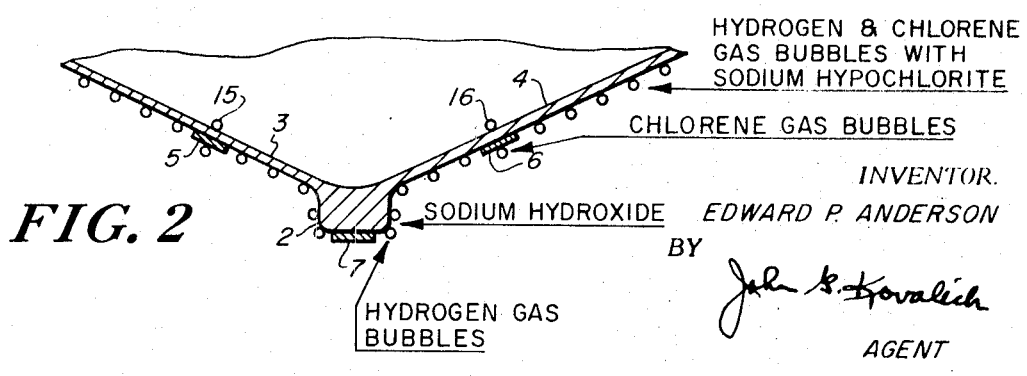
FIG. 2 illustrates a partly electrochemically diagrammatic and a partly fragmentary cross-sectional view along lines 2–2 of FIG. 1

In operation, especially when the boat or ship is at dock, the switch 14 is closed and the electrodes are energized while immersed in the electrolyte, e.g., sea water. In such case, as illustrated by FIG. 2, hydrogen gas bubbles and sodium hydroxide are evolved at the cathode 7 on keel 2 and travel upwardly along sides 3 and 4 over anodes 5 and 6 with chlorine gas bubbles being evolved at the anodes 5 and 6 and where sodium hypochlorite is formed. Thereafter, a toxic stream of hydrogen and chlorine gas bubbles together with sodium hypochlorite rises upwardly of the sides 3 and 4 to the water level at the hull and which toxic stream is effective in preventing fouling of the hull as above described.

After prolonged use of the antifouling system the electrochemical process tends to deposit a calcarious film on the cathode tape 7. This film can be electrochemically removed by periodically reversing the polarity of the anode and cathode tapes, for example, by a polarity reversing switch means 17, diagrammatically illustrated in FIG. 1, connected across the source 8 by conductors 18 and 19.

I claim:

1. A marine antifouling system for boat or ship hulls having a keel and sides diverging upwardly therefrom, the antifouling system comprising a pair of laterally spaced elongated anode electrode components each mounted externally on one side of the hull substantially adjacent the keel and lengthwise thereof, an elongated cathode electrode component mounted externally on and lengthwise of the keel in spaced relationship between the anode electrode components, the electrodes being composed of platinum-coated titanium, tantalum or niobium, a source of electrical current and electric circuit means therefor for energizing the anode electrode components with a positive potential and the cathode electrode component with a negative potential while immersed in an electrolyte, the cathode electrode component being electrolytically common to the anode electrode components.

2. A marine antifouling system according to claim 1, comprising a secondary conductor means electrically extending along the length of each anode electrode and electrically connected in parallel across each anode electrode.

3. A marine antifouling system according to claim 1, comprising means for reversing the polarity of the said anode electrodes and the said cathode electrode.

* * * * *